United States Patent [19]

Anderson

[11] Patent Number: 4,712,031
[45] Date of Patent: Dec. 8, 1987

[54] UNIT BEARING MOTOR WITH HYDRODYNAMIC LUBRICATING SYSTEM

[75] Inventor: Linda K. Anderson, Roscoe, Ill.

[73] Assignee: Ancor Industries, Inc., Rockford, Ill.

[21] Appl. No.: 930,685

[22] Filed: Nov. 12, 1986

[51] Int. Cl.[4] .................. H02K 5/16; F16C 3/14; F16C 33/10

[52] U.S. Cl. .................. 310/90; 384/372; 384/385; 384/392

[58] Field of Search .............. 310/90, 67 R; 384/140, 384/142, 143, 144, 286, 303, 372, 374, 377, 385, 390, 392, 420, 424, 465, 469, 473, 477, 472; 415/90

[56] References Cited

U.S. PATENT DOCUMENTS

| | | | |
|---|---|---|---|
| 1,296,211 | 3/1919 | Parsons et al. | 384/424 |
| 2,264,635 | 12/1941 | Graham | 384/473 |
| 2,604,188 | 7/1952 | Marchant | 415/90 |
| 3,626,221 | 12/1971 | Anderson | 310/90 |
| 3,749,954 | 7/1973 | Anderson, Jr. | 310/90 |
| 3,763,386 | 10/1973 | Anderson | 310/90 |
| 4,037,984 | 7/1977 | Rafferty et al. | 415/90 |

*Primary Examiner*—Patrick R. Salce
*Assistant Examiner*—D. L. Rebsch
*Attorney, Agent, or Firm*—Leydig, Voit & Mayer

[57] ABSTRACT

The rotor of a shaded pole motor includes a central housing supported on a stationary shaft by two axially spaced sleeve bearings which are pressed tightly into the housing and which rotate on the shaft. The opposing inboard faces of the bearings are formed with enlarged diameter and circumferentially continuous throats located adjacent the shaft. During rotation of the bearings, oil is pumped continuously though a closed system and forms a pressurized film between the bearings and the shaft so as to reduce friction and wear.

15 Claims, 11 Drawing Figures

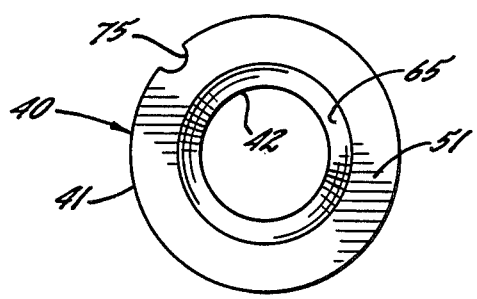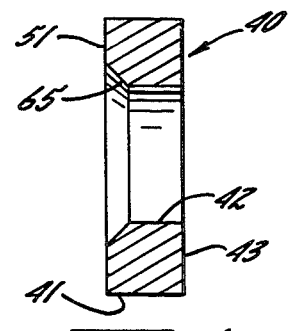
fig. 5.  fig. 6.
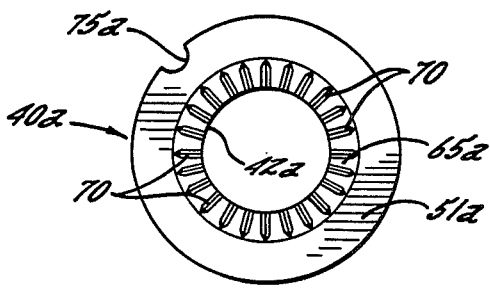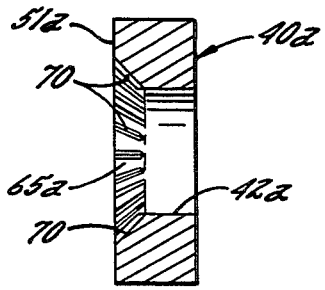
fig. 7.  fig. 8.
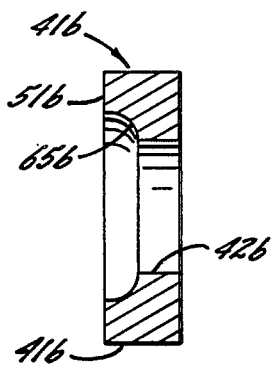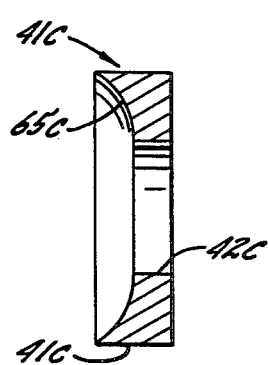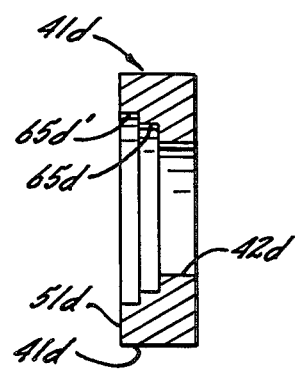
fig. 9.  fig. 10.  fig. 11.

UNIT BEARING MOTOR WITH HYDRODYNAMIC LUBRICATING SYSTEM

BACKGROUND OF THE INVENTION

This invention relates to electric motors and the like and, more particularly, to an electric motor of the type having a pair of axially spaced sleeve bearings which are telescoped into a housing carried by a rotor and rotate on a stationary shaft projecting from a stator assembly. The bearings are made of porous material and are adapted to be permanently lubricated by an oil impregnated liner which is telescoped into the housing around the shaft and which is sandwiched between the opposing inboard faces of the bearings. Motors of this general type are disclosed in Lautner U.S. Pat. No. 2,904,709, in Anderson et al U.S. Pat. No. 3,626,221 and in Anderson, Jr. U.S. Pat. No. 3,763,386 and are commonly referred to as unit bearing motors.

The bearings of the motor disclosed in the '386 Patent are formed with angularly spaced passageways (e.g., slots or holes) which establish communication between the liner and the surface of the shaft. Oil seeping along the shaft accumulates in the passageways and is slung back to the liner by the centrifugal force generated by the rotating bearings. When the motor is idle, oil tends to accumulate in the passageways adjacent the shaft rather than bleeding out of the housing between the shaft and the bearings.

While the bearings of the '386 Patent are, in many respects, adequate from a functional standpoint, it is relatively expensive to form the angularly spaced slots or holes in the bearings. Milling of the slots is costly and, if the slots are molded in bearings of sintered bronze or the like, difficulty is encountered in releasing the die parts without distorting the slots or chipping the bearings. Moreover, the lubricating system of the motor of the '386 Patent is not completely sealed and thus, in certain instances, some oil leakage can occur and leave the bearings without sufficient lubrication.

SUMMARY OF THE INVENTION

The general aim of the present invention is to provide a new and improved unit bearing motor having a substantially sealed hydrodynamic lubricating system and having unique bearings which promote the circulation of oil in the system and which may be manufactured in a comparatively easy and inexpensive manner.

A more detailed object of the invention is to achieve the foregoing by providing a motor in which oil in a sealed reservoir is circulated past the running surfaces of the bearings with a hydrodynamic pumping action and in which the opposing inboard faces of the bearings are shaped with enlarged circumferentially continuous and easily formed throats which provide a smooth flow of oil to the running surfaces.

The invention also resides in the novel shape of the throats in the bearings together with the unique manner of sealing the lubricating system.

These and other objects and advantages of the invention will become more apparent from the following detailed description when taken in conjunction with the accompanying drawings.

BRIEF DESCRIPTION OF THE DRAWINGS

FIG. 5 is a front elevational view of one of the bearings shown in FIG. 3.

FIG. 6 is a sectional view taken axially through the bearing shown in FIG. 5.

FIGS. 7 and 8 are views similar to FIGS. 5 and 6, respectively, but show another embodiment of a bearing incorporating the features of the invention.

FIGS. 9, 10 and 11 are sectional views similar to FIG. 6 but respectively show three additional embodiments of bearings constructed in accordance with the invention.

DETAILED DESCRIPTION OF THE PREFERRED EMBODIMENTS

Figure 1:
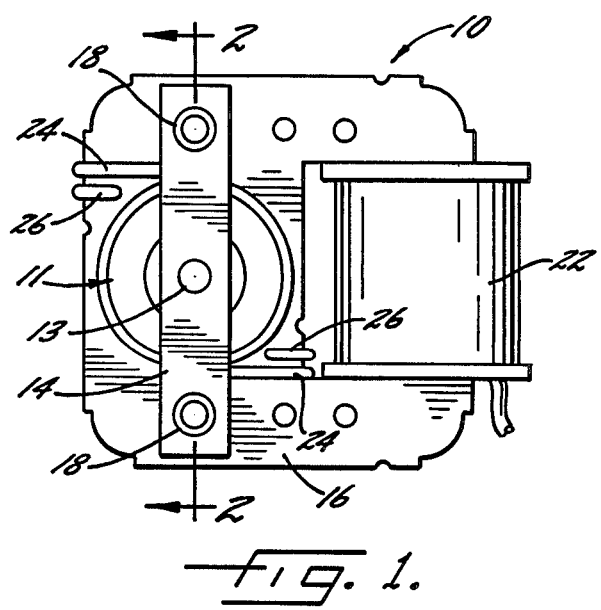
FIG. 1 is a front elevational view of a unit bearing motor equipped with a new and improved lubricating system and new and improved bearings incorporating the unique features of the present invention.

As shown in the drawings for purposes of illustration, the invention is embodied in a shaded-pole motor 10 generally comprising a cylindrical rotor 11 journaled for rotation on a cantilevered shaft 13 rigid with and projecting outwardly from the base or frame bracket 14 of a stator assembly. The frame bracket supports a field core 16 which is formed by sets of stacked laminations secured to the bracket by pins 18 and defining a cylindrical opening 20 within which the rotor is disposed. Wrapped around a portion of the stator is a primary winding 22 adapted for connection to a source of alternating current voltage, and placed in selected positions in the stator are the usual shading coils 24 and 26.

Figure 2:
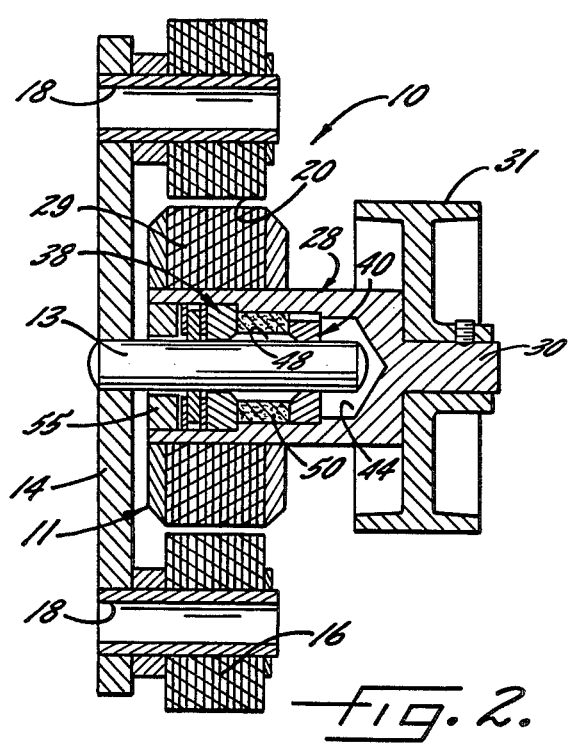
FIG. 2 is an enlarged cross-section taken substantially along the line 2—2 of FIG. 1.
Figure 3:
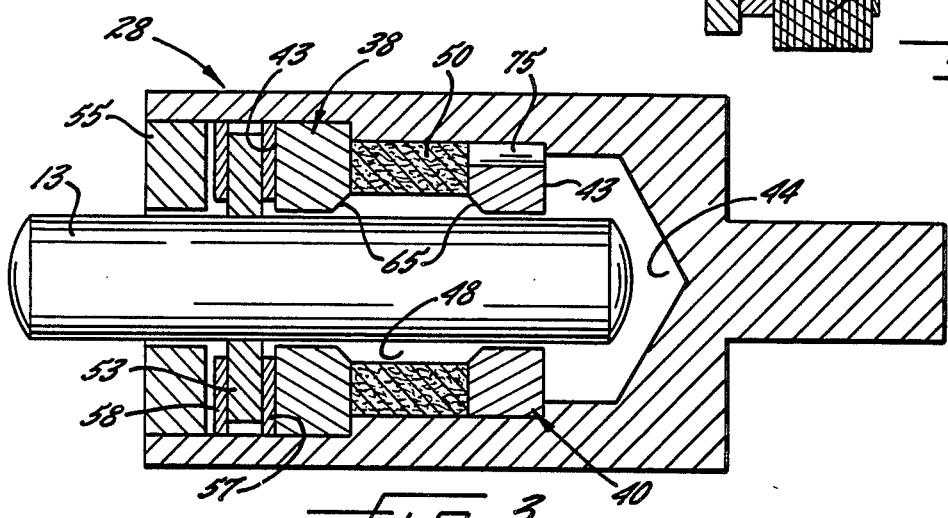
FIG. 3 is a sectional view on an enlarged scale of certain parts shown in FIG. 2.

The rotor 11 includes a central tubular bearing housing 28 (FIG. 2) press-fitted into a series of stacked sheet metal stampings 29 which coact with a plurality of conductors (not shown) to form the secondary winding of the motor. Alternatively, the housing 28 may be formed as an integral part of the secondary winding of the motor. The outer end of the housing is closed and is formed with a reduced-diamter arbor 30 adapted to support a device such as the hub 31 of a fan blade (not shown) which is driven by the motor 10. As shown most clearly in FIG. 3, the housing 28 is telescoped onto the shaft 13 and is supported thereon by inner and outer axially spaced bearings 38 and 40 which are press-fitted tightly into the housing and received rotatably on the shaft with a close but free-running fit so as to enable the rotor 11 to turn freely on the shaft. Each bearing is molded from sintered bronze or other suitable material, is formed with a cylindrical outer wall 41, and is formed with an inner wall having a cylindrical portion 42 of substantial length.

Figure 4:
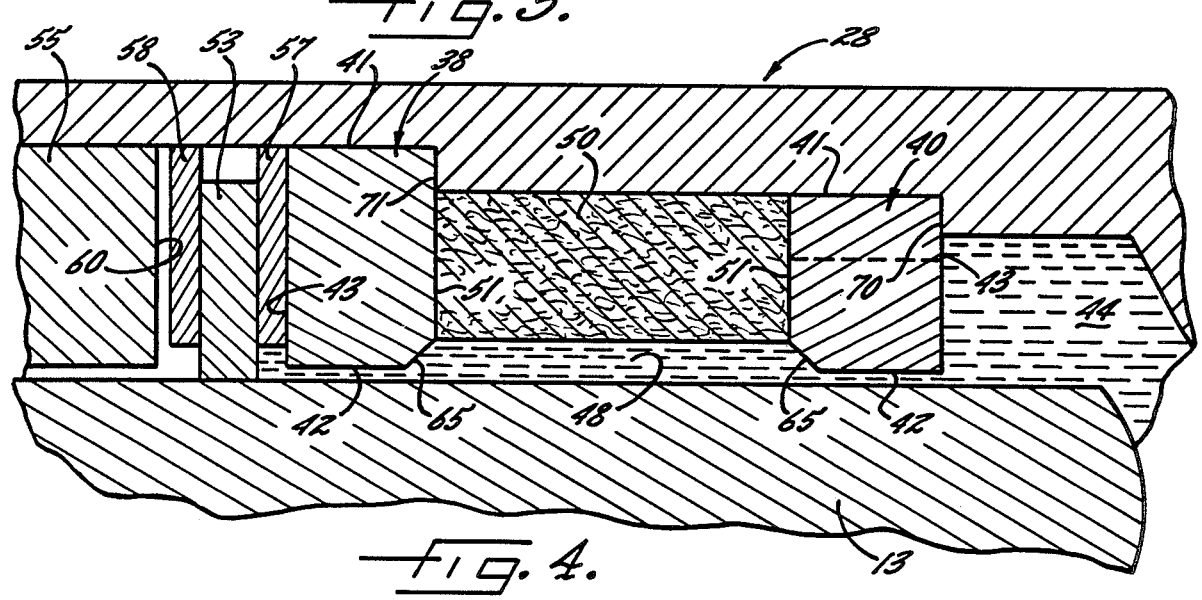
FIG. 4 is a fragmentary sectional view on a still greater enlarged scale of the parts illustrated in FIG. 3.

In accordance with one aspect of the invention, the outboard face 43 of the outer bearing 40 coacts with the interior of the housing 28 adjacent the outer or forward end thereof to define a reservoir 44 adapted to be filled with oil for lubricating the bearings as the latter rotate on the shaft. Defined between the bearings 38 and 40 is an annular chamber 48 (FIGS. 3 and 4) which also is filled with oil and which, pursuant to the invention, coacts with the reservoir 44 to define a closed system for the oil. A tubular liner 50 of felt or other absorbent material is disposed within the chamber with its ends preferably contacting the opposing inboard faces 51 of the two bearings.

In order to seal the chamber 48 outboard of the bearing 38, an aluminum retaining ring 53 is pressed tightly onto the shaft 13 but is received in the housing 28 with radial clearance so as to permit the housing to rotate relative to the ring. In addition, a second ring or annular end cap 55 is pressed tightly into the extreme end portion of the housing while being free to rotate on the shaft. Herein, the retaining ring 53 is sandwiched between two thrust washers 57 and 58 (FIG. 4) which are spaced radially from the shaft and which loosely engage the inner wall of the housing 28. The washer 57 is located adjacent the outboard face 43 of the bearing 38, while the washer 58 is located between the ring 53 and the end cap 55. The axial spacing between the bearing 38 and the end cap 55 is somewhat greater than the combined axial dimensions of the retaining ring 53 and the washers 57 and 58, and thus a narrow axial gap 60 (FIG. 4) is left between the end cap and the washer 58. Accordingly, the housing 28 may pulsate axially relative to the shaft 13 through a limited distance, so as to enable the rotor 11 to have end play relative to the stator core 16 when the motor 10 is energized.

As a result of the ring 53, the end cap 55 and the thrust washers 57 and 58, the end of the chamber 48 adjacent the bearing 38 is virtually sealed. The ring, the end cap and the washers define a baffle-type labyrinth which tends to prevent oil from escaping out of the chamber 48 and past the ring.

When the housing 28 and the bearings 38 and 40 rotate and pulsate on the shaft 13, a pumping action is created by the bearings to cause oil to circulate in the reservoir 44 and the chamber 48 in a closed circuit and to hydrodynamically support the bearings on the shaft. In accordance with the invention, the bearings are uniquely constructed with enlarged diameter throats 65 which allow the oil to flow smoothly to and from the bearings and the shaft at a relatively high velocity and with comparatively low turbulence. As a result, a relatively high pressure film is established between the shaft and the cylindrical portions 42 of the bearings so as to reduce friction and wear.

In the embodiment of the invention shown in FIGS. 1 to 6, the enlarged diameter throat portion 65 of each bearing 38, 40 is shaped as a circumferentially continuous frustoconical surface or frustum which is located at the junction of the cylindrical portion 42 of the bearing with the inboard face 51 thereof. The cylindrical portion 42 terminates short of the inboard face 51 while the frustoconical throat 65 gradually increases in diameter upon progressing from the cylindrical portion 42 toward the inboard face 51. It is a simple matter to form the frustoconical throat 65 in the bearing as an incident to molding the bearing through the use of an appropriately shaped die.

With the foregoing arrangement, the rotating and pulsating bearing 40 acts as a pump to draw oil from the reservoir 44 and into the chamber 48 with a venturi action. Upon passing between the shaft 13 and the cylindrical portion 42 of the bearing 40, the oil creates a pressurized film between the bearing and the shaft. The rotational force of the housing 28 slings oil from the shaft 13 and into the absorbent liner 50. Then, the oil is drawn by capillary action to the inner wall of the housing 28, flows along such wall and then contacts the inboard faces 51 of the bearings 38. The oil at the inboard face of the bearing 38 is guided into the throat 65 of the bearing 38 and flows smoothly as a pressurized film between the shaft 13 and the cylindrical portion 42 of the bearing 38. As a result, oil is constantly circulated and the bearings are constantly lubricated. The enlarged throats 65 smooth the flow and reduce turbulence so as to increase the velocity of flow between the bearings and the shaft and produce good hydrodynamic action.

For ease and economy of manufacture, the bearings 38 and 40 with the frustoconical throats 65 are preferred. Throats of other shapes, however, may be used as exemplified by the bearing 40a shown in FIGS. 7 and 8 and by the bearings 40b, 40c and 40d shown in FIGS. 9, 10 and 11, respectively. Like the bearing 40, the bearing 40a of FIGS. 7 and 8 is formed with a frustoconical throat 65a but, in this instance, several angularly spaced and radially extending grooves 70 are formed in the surface of the frustum. The throat 65b of the bearing 40b (FIG. 9) defines a surface which, in cross section, is concavely curved along an arc having one end terminating at one end of the cylindrical portion 42b of the inner wall of the bearing and having an opposite end terminating at the inboard face 51b of the bearing at a point spaced radially inwardly from the outer wall 41b thereof. The bearing 40c shown in FIG. 6 is of a cross-sectional shape somewhat similar to that of the bearing 40b but, in this instance, the throat 65c is curved along an arc having one end terminating at the inboard end of the cylindrical portion 42c of the inner wall and having an opposite end terminating at the extreme inboard end of the outer wall 41c. The bearing 40d of FIG. 11 includes a first cylindrical throat 65d located immediately adjacent to and of greater diameter than the cylindrical portion 42d and further includes a still larger diameter cylindrical throat 65d' extending from the throat 65d to the inboard face 51d of the bearing. From the standpoint of promoting smooth flow and reducing turbulence, the bearing 41c of FIG. 10 is preferred.

Assembly of the rotor 11 is effected by pressing the housing 28 into the stack of stampings 29 with a tight fit. The bearing 40 then is pressed into the housing until the bearing seats against an annular locating shoulder 70 (FIG. 4) formed in the housing. Next, the tubular liner 50 is slipped loosely into the housing and then the bearing 38 is pressed into the housing in tight engagement with a second annular shoulder 71. Thereafter, the thrust washer 57, the retaining ring 53 and the thrust washer 58 are slipped into the housing. After the end cap 55 has been pressed a predetermined distance into the housing, an elongated nozzle (not shown) is inserted through the end cap and into the housing until the tip of the nozzle is closely adjacent the closed end of the reservoir 44. A quantity of oil is injected through the nozzle while the latter is in an upright position with the tip facing downwardly. Oil thus fills the system from the bottom of the reservoir up, so as to push air from the system and to prevent the formation of air bubbles. When the system is completely filled with oil to the level of the retaining ring 53, the nozzle is removed and the shaft 13 is inserted into the housing 28 in a tight press-fit relation with the inner diameter of the retaining ring.

To enable the shaft 13 to be pressed into the oil-filled housing 28, a vent 75 (FIGS. 3 and 5) is formed in the bearing 40 to permit oil to flow from the reservoir 44 as the shaft is thrust into the reservoir. For economy and simplicity of manufacture, the vent 75 preferably is in the form of a notch (FIG. 5) formed in and opening radially outwardly of the outer wall 41 of the bearing. The vent notch may be formed more easily than a vent in the form of a hole which extends axially through the bearing between the inner and outer walls thereof. If required, a similar vent notch may be formed in the bearing 38.

I claim:

1. An electric motor having a stator assembly with a stationary cylindrical shaft extending outwardly therefrom, a rotor having a centrally located tubular housing telescoped over said shaft, first and second axially spaced sleeve bearings of porous material fixed tightly within said housing and rotatable on said shaft, each of said bearings having inner and outer walls and having inboard and outboard faces, said housing and the outboard face of said first bearing coacting to define an oil reservoir, a tubular liner of absorbent material telescoped into said housing and over said shaft and sandwiched between the inboard faces of said bearings, there being substantial radial clearance between said liner and said shaft whereby the space between said liner and said shaft defines an annular oil chamber, said reservoir and said chamber communicating with one another and being completely filled with oil, means adjacent the outboard face of said second bearing for substantially sealing said chamber outboard of said second bearing whereby said reservoir and said chamber define a substantially sealed system, the inner wall of each bearing including a cylindrical portion of predetermined diameter and length telescoped over said shaft with a close but rotatable fit, the cylindrical portion of the inner wall of each bearing terminating short of the inboard face of the bearing, and the inner wall of each bearing having a substantially circumferentially continuous enlarged diameter portion of circular cross-section extending from said cylindrical portion to the inboard face of such bearing whereby centrifugal force created by rotation of said housing an said bearings causes oil to circulate within said reservoir and said chamber and whereby said enlarged diameter portions of said bearings promote the flow of oil between said shaft and said cylindrical portions of the inner walls of said bearings.

2. An electric motor as defined in claim 1 in which said enlarged diameter portion of said inner wall of each bearing includes a surface shaped as a frustum which increases in diameter upon progressing axially from said cylindrical portion of said inner wall toward the inboard face of said bearing.

3. An electric motor as defined in claim 2 in which said frustum is smooth.

4. An electric motor as defined in claim 2 further including angularly spaced and generally radially extending grooves formed in said frustum.

5. An electric motor as defined in claim 1 in which said enlarged diameter portion of said inner wall of each bearing includes a surface which is concavely curved.

6. An electric motor as defined in claim 5 in which said surface is curved along an arc having one end terminating at the inboard end of the cylindrical portion of said inner wall and having an opposite end terminating at the inboard face of said bearing at a point spaced radially inwardly from the outer wall thereof.

7. An electric motor as defined in claim 5 in which said surface is curved along an arc having one end terminating at the inboard end of the cylindrical portion of said inner wall and having an opposite end terminating at the extreme inboard end of the outer wall of said bearing.

8. An electric motor as defined in claim 1 in which said enlarged diameter portion of each bearing is cylindrical and is located immediately adjacent said cylindrical portion of predetermined length and diameter, the inner wall of each bearing further including a second circumferentially continuous enlarged diameter portion of greater diameter than said one enlarged diameter portion and extending from the latter to the inboard face of the bearing.

9. An electric motor as defined in claim 1 further including a radially outwardly opening vent notch formed in the outer wall of said first bearing.

10. An electric motor as defined in claim 1 in which said means comprise a first ring pressed tightly onto said shaft and received within said housing with rotatable clearance, said means further comprising a second and axially spaced ring pressed tightly into said housing and rotatable on said shaft with radial clearance.

11. An electric motor as defined in claim 10 further including a pair of axially spaced thrust washers located on opposite sides of said first ring, said washers being rotatable relative to both said housing and said shaft.

12. An electric motor as defined in claim 11 in which said first ring and said thrust washers are located between said second bearing and said second ring.

13. An electric motor having a stator assembly with a stationary cylindrical shaft extending outwardly therefrom, a rotor having a centrally located tubular housing telescoped over said shaft, first and second axially spaced sleeve bearings of porous material fixed tightly within said housing and rotatable on said shaft, each of said bearings having inner and outer walls and having inboard and outboard faces, said housing and the outboard face of said first bearing coacting to define an oil reservoir, a tubular liner of absorbent material telescoped into said housing and over said shaft and sandwiched between the inboard faces of said bearings, there being substantial radial clearance between said liner and said shaft whereby the space between said liner and said shaft defines an annular oil chamber, said reservoir and said chamber communicating with one another and being completely filled with oil, means adjacent the outboard face of said second bearing for substantially sealing said chamber outboard of said second bearing whereby said reservoir and said chamber define a substantially sealed system, the inner wall of each bearing including a cylindrical portion of predetermined diameter and length telescoped over said shaft with a close but rotatable fit, the cylindrical portion of the inner wall of each bearing terminating short of the inboard face of the bearing, and the inner wall of each bearing having a substantially circumferentially continuous frustoconical portion extending from said cylindrical portion toward the inboard face of such bearing and progressively increasing in diameter upon progressing toward said inboard face whereby centrifugal force created by rotation of said housing and said bearings causes oil to circulate within said reservoir and said chamber and whereby said frustoconical portions of said bearings promote the flow of oil between said shaft and said cylindrical portions of the inner walls of said bearings during such circulation.

14. An electric motor as defined in claim 13 in which said means comprise a first ring pressed tightly onto said shaft and received within said housing with rotatable clearance, said means further comprising a second and axially spaced ring pressed tightly into said housing and rotatable on said shaft with radial clearance.

15. An electric motor as defined in claim 1 in which said housing is of one-piece construction having an open inner end and a completely closed outer end, said reservoir being defined between the closed outer end of said housing and the outboard face of said first bearing.

* * * * *